Aug. 15, 1950  H. J. FRAMHEIN  2,519,128
LIFT TRUCK
Filed April 26, 1946  3 Sheets-Sheet 2
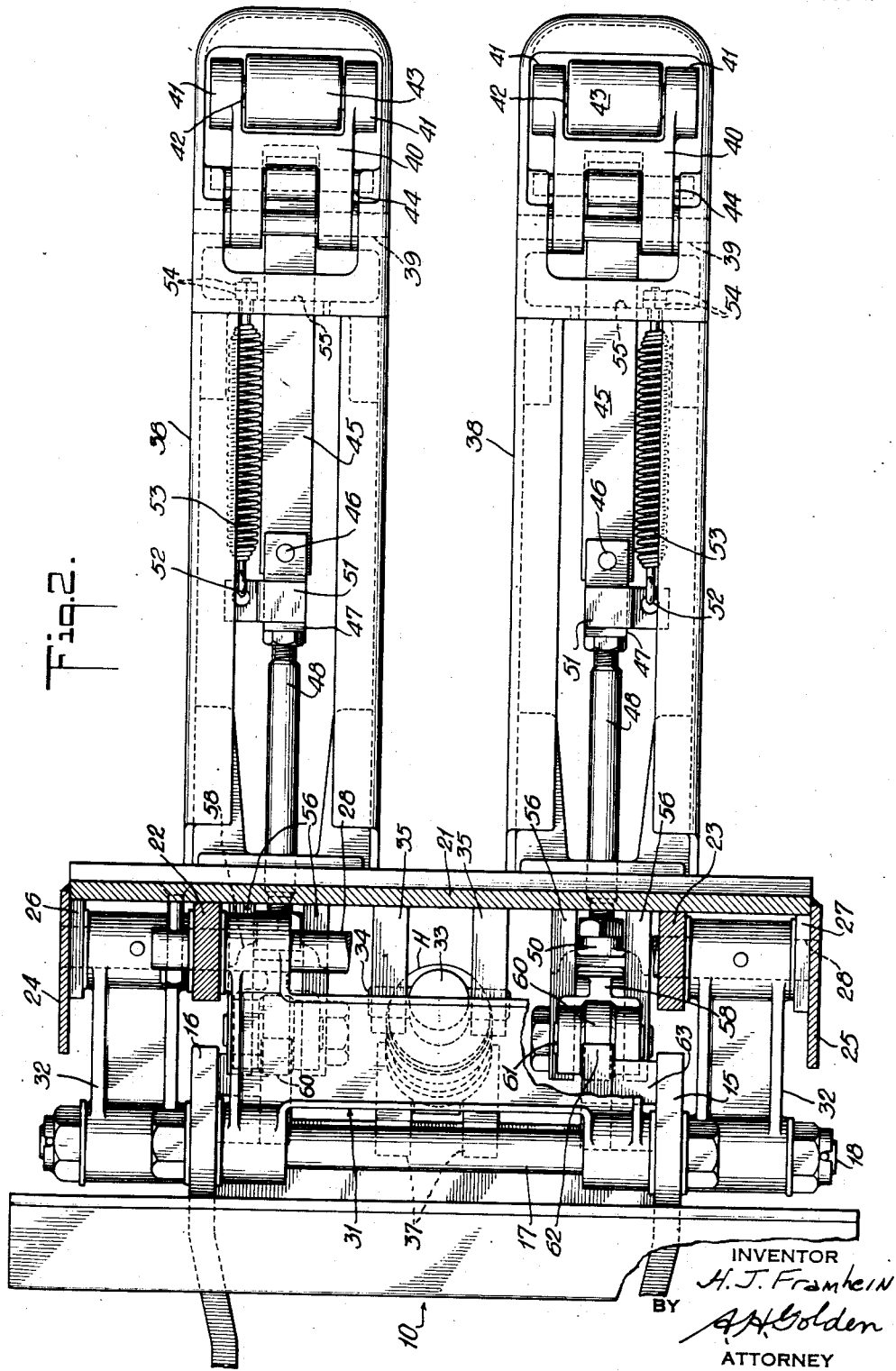
INVENTOR
H. J. Framhein
BY
A. H. Golden
ATTORNEY

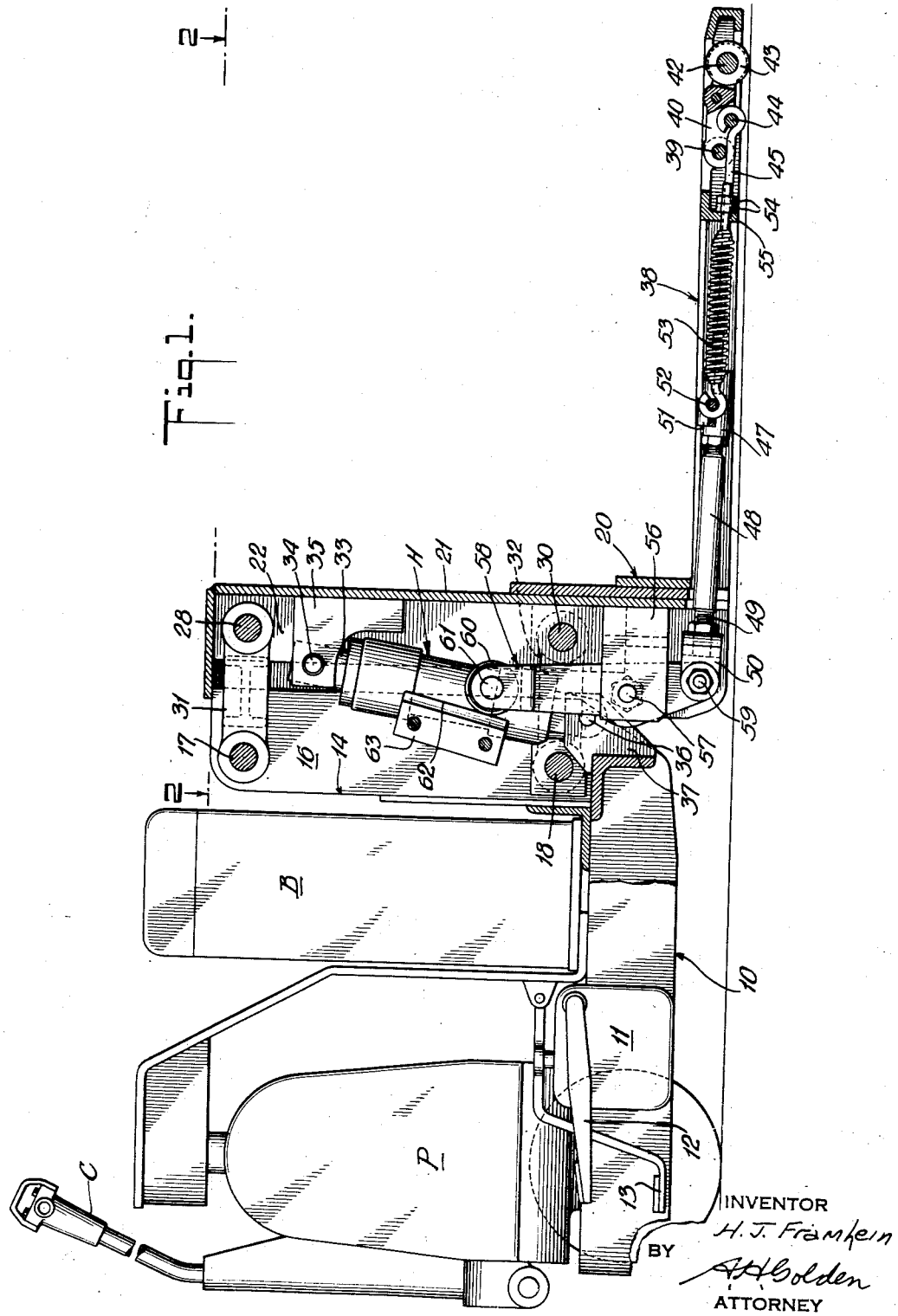

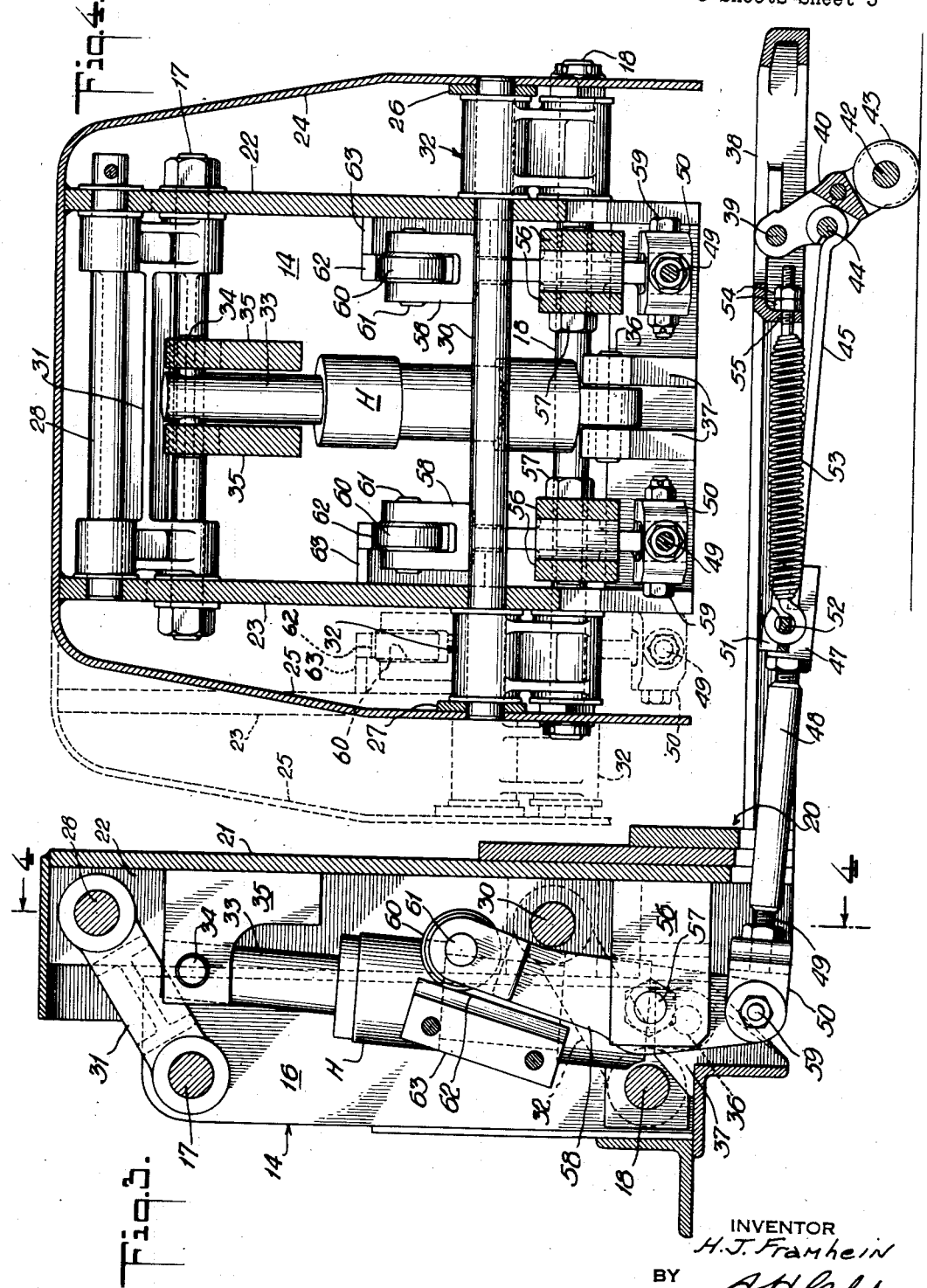

Patented Aug. 15, 1950

2,519,128

UNITED STATES PATENT OFFICE 2,519,128

LIFT TRUCK

Herbert J. Framhein, Chicago, Ill., assignor to The Yale & Towne Manufacturing Company, Stamford, Conn., a corporation of Connecticut Application April 26, 1946, Serial No. 665,276

13 Claims. (Cl. 254—2)

This invention relates to a lifting truck of the type having a lifting head and an elevating frame or platform adapted to be raised and lowered relatively to said lifting head. More particularly, my invention relates to that type of truck in which one end of the elevating platform is raised by the movement relatively thereto of lifting wheel support members that are preferably pivoted to the elevating platform.

In trucks of the particular class, it is the general practice to extend rods from the lifting wheel support members to the forward end of the elevating platform, means being then provided for moving the said rods as the forward end of the elevating platform is elevated. For the particular purpose, the forward end of the elevating platform is suitably mounted for upward and downward movement relatively to the lifting head of the truck. Where the truck is constructed with a very low elevating platform and small rear lifting wheels for particular cooperation with pallets, it frequently happens that the means for actuating the rods and the lifting wheel support members protrude downwardly when the elevating platform is raised. Because the said means so protrude, they form obstructions against the movement of the truck over ramps and certain types of floors, all as is well understood by those skilled in the art. Thus, where the truck moves on an up-grade that suddenly changes to a downgrade, the resulting peak between the grades will be encountered by the actuating means described and will act to damage the truck or else obstruct its movement.

The same difficulty is found in trucks of the type illustrated in my application, Ser. No. 481,957 filed April 6, 1943, now Patent No. 2,439,599, filed April 13, 1948, in which a lever pivoted on the elevating platform is moved on its pivot as the elevating platform is raised. This lever, through this pivotal movement, actuates the rear lifting wheels to raise the rear end of the elevating platform. In this movement of the lever, a part thereof moves downwardly as the lever pivots into an obstructing position relatively to the truck. It is this inherently troublesome feature of trucks in this art that my invention seeks to obviate.

It is the object of my invention to contribute a truck of the class described in which the means for actuating the rods and lifting wheel support members will not extend into obstructing relation to the ground or floor traversed by the truck.

As a feature of my invention, I utilize actuating levers for the rods, with said levers adapted to extend vertically upwardly away from the rods for operation by suitable mechanism. More particularly, this feature of my invention resides in the utilization of levers pivoted on the forward end of the elevating platform. Portions of the levers extend below the pivots and are secured to the rods extending to the support members carrying the rear lifting wheels. Other portions of the levers extend upwardly from the pivots for actuation upon lifting movement of the elevating platform.

A feature of my invention that is of particular value resides in the mounting of the means for actuating the levers. These means are preferably cam surfaces that may be fixed to the lifting head in such relation thereto as to accommodate varying widths of elevating platforms with correspondingly differently spaced levers. In this way, I am able to use a single lifting head and varying widths of elevating platforms, it being necessary merely to change the positioning of the cam surfaces.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized by those skilled in the art as a basis for the designing of other structures for carrying out the several purposes of my invention. It is important, therefore, that the claims to be granted me shall be of sufficient breadth to prevent the appropriation of my invention by those skilled in the art.

Referring now to the drawings, Fig. 1 is a partial vertical section of the truck of my invention. Fig. 2 is a section taken along lines 2—2 of Fig. 1. Fig. 3 is a view similar to Fig. 1 of the rear of the truck and illustrates the elevating platform in its elevated position. Fig. 4 is a section taken along lines 4—4 of Fig. 3.

Referring now more particularly to the drawings, the lifting head of my invention is designated by reference numeral 10 and is adapted to support a steering and power unit P controlled by a steering and controlling handle C, the power for the unit P being obtained from a battery B. The mechanism thus described is adapted to convert the lifting head 10 into a power traction unit, and those that would like to understand the details of this unit are referred to my Patent No. 2,327,583 dated August 24, 1943. For the purposes of the present invention, it is merely necessary to appreciate that the lifting head 10 is adapted for tractive movement and for steering by the handle C.

Mounted on the lifting head is a pump 11 controlled by a treadle 12 and a further treadle 13, the pump 11 and the treadles 12, 13 being adapted to actuate and control a hydraulic ram H in the usual manner well understood by those skilled in the art.

The lifting head 10 is formed with a rear vertical standard 14 having bearing plates 15 and 16 on which are supported an upper transverse shaft 17 and a lower transverse shaft 18. The elevating platform 20 of my invention is formed with a complementary forward vertical standard 21 having bearing plates 22 and 23. Secured as an integral part of the vertical standard 21 are outer plates 24 and 25, these plates being reinforced at 26 and 27 as probably best illustrated in Fig. 4. On the upper portions of the bearing plates 22 and 23 there is supported a shaft 28 while on the lower portions of the bearing plates 22 and 23 there is supported a shaft 30, the ends of which shaft extend into plates 24 and 25 and reinforcing parts 26 and 27.

An upper link member 31 is pivoted on the shafts 28 and 17 and thereby mounts the elevating platform 20 for upward pivotal movement relatively to the lifting head 10. In somewhat similar fashion, a pair of opposed lower link members 32 are pivoted about shafts 30 and 18 and thereby similarly mount the elevating platform 20 for upward pivotal movement relatively to the lifting head 10. As is quite apparent from Figs. 1 and 3, the upper link 31 is parallel to the lower links 32, thereby contributing a smooth upward pivotal movement of the elevating platform 20 relatively to the lifting head 10.

For imparting upward movement to the elevating platform 20, I utilize the hydraulic ram H to which reference has already been made, the piston 33 of the hydraulic ram H being pivoted at 34 to a pair of brackets 35 fixed to the forward standard 21 of the elevating platform 20, the cylinder of the ram H being pivoted at 36 to brackets 37 forming an integral part of the lifting head 10.

The elevating platform 20, when adapted for cooperation with a pallet, preferably comprises a pair of legs 38 welded or otherwise secured to the vertical standard 21 to form an integral part thereof. These legs may may be spaced in accordance with the pallets to be handled by the truck as those skilled in the art will appreciate, and as was indicated earlier, one feature of my invention resides in the adaptability of the truck whereby the same lifting head may be utilized with differently spaced legs 38.

Since the legs 38 are substantially identical except that they are in opposed relation, I shall merely describe one of the said legs. Thus, each leg 38 supports a shaft 39 on which is pivoted what I call a support member for a lifting wheel, this member being designated by reference numeral 40. Support member 40 is bifurcated to form bearings 41 for a shaft 42 on which is carried a rear lifting wheel 43. A stub shaft 44 is carried by the member 40 and secured to this stub shaft is a narrow plate-like rod 45 welded or otherwise secured at 46 to a connecting member 47. Connecting member 47 is adjustably connected by threading to a rod 48 that is in turn screw threaded at 49 so as to be secured adjustably to a connecting member 50. Welded to the first connecting member 47 is a plate 51 to which is secured at 52 one end of a spring 53, the other end of the spring 53 being adjustably secured by nuts 54 to a bracket 55 of the leg 38. The function of the spring 53 is to maintain the wheel 43 and its support member 40 yieldingly in the lowered position of Fig. 1, and to urge the said parts to the said position from the position of Fig. 3, the spring 53 being extended when in its position of Fig. 3.

For the purposes of understanding the present invention, it is merely necessary to consider that the parts 45, 47, 48 and 50 comprise a rod assembly. Actually, the said parts could be one piece, but are made in several pieces by me so as to facilitate fabrication and adjustment. The truck so far described is conventional, and it is to this type of truck that my invention is applied. I shall now describe the novel features of my invention.

At each side of the forward standard 21 of the elevating platform there is secured a pair of brackets 56, these brackets being preferably centered relatively to the legs 38. In the actual construction of a truck of my invention, it is possible to weld the brackets 56 in any desired position depending upon the spacing of the legs. Supported on each pair of brackets is a pivot shaft 57 and pivoted on each shaft is a lever 58. Each lever extends downwardly from its pivot shaft 57 and is pivoted at 59 to a connecting member 50 of a rod assembly earlier described. Each lever 58 extends upwardly from its pivot on shaft 57 and mounts on its upper end a roller 60, being preferably bifurcated at its upper end for supporting the said roller through a stub shaft 61. Co-acting with each roller 60 is a cam surface 62 formed as part of a cam 63, there being two of these cams secured as best illustrated in Fig. 4 to the bearing plates 15 and 16.

It is, of course, readily appreciated that when the elevating platform is raised from its position of Fig. 1 to its position of Fig. 3, the levers 58 will be rotated about their pivots 57 to move the rod assemblies and the rear wheel support members 40 and thereby elevate the rear ends of the legs 38 of the truck.

Those skilled in the art will now appreciate that when the elevating platform is in its lowered position there are no parts of the lifting mechanism extending below the rod assemblies of the truck legs 38. The same is true when the parts are in the elevated position of Fig. 3, the levers 58 and connecting parts 50 being then in practically the same relation as in Fig. 1 relatively to the truck. Thus, the pivots 57 are so related to pivots 59 that pivots 57 will move only laterally and upwardly when the levers 58 are rotated by cam surfaces 62. This is an exceedingly important feature, and while it is exceedingly simple, it is nevertheless a contribution that has been sought since the truck industry began the utilization of pallet handling trucks of the class described.

In dotted lines at the left of Fig. 4 I illustrate a truck platform of greater width from that shown in full lines in Fig. 4. To accommodate such a platform, while utilizing the same lifting head as employed with the narrower platform, it is merely necessary to secure the cam 63 in the dotted line position shown at the left of Fig. 4. Of course, the lower links 32 between the elevating platform 20 and the lifting head will also have to be changed, but the lifting head will remain exactly the same as when the narrow platform is used. Thus, by a very simple change of but a few parts, the lifting head is adapted for co-action with an elevating platform of different width. This feature is extremely valuable in this art. I believe that the construction and utility of my invention will now be understood.

I now claim:

1. In a truck of the class described, a lifting head, an elevating platform, means mounting the forward end of said elevating platform for upward movement relatively to said lifting head, means for imparting upward movement to the forward end of said elevating platform relatively to said lifting head, a lifting wheel support member pivoted to the rear end of said elevating platform, a lifting wheel mounted on said support member adapted for pivotal movement therewith to lift the rear end of said elevating platform, an actuating rod extending from said support member under the elevating platform to the front end thereof, a lifting lever pivoted on the forward end of said elevating platform, a portion of the lever extending downwardly from said pivot, means pivoting said downwardly extending portion to the forward end of said rod in substantially vertical alignment with said pivot, a portion of said lifting lever extending upwardly from said pivot, a cam surface fixed on said lifting head, and the upwardly extending portion of said lever bearing against said cam surface for movement thereby as said elevating platform moves upwardly relatively to said lifting head whereby to impart lifting movement to said lifting wheel support member and the lifting wheel mounted thereon.

2. In a truck of the class described, a lifting head having a vertical standard, an elevating platform having a vertical standard at the front end thereof, means mounting the forward vertical standard of said elevating platform for upward lifting movement relatively to the standard of said lifting head, means for imparting upward movement to the forward end of said elevating platform relatively to said lifting head, a lifting wheel support member pivoted to the rear end of said elevating platform, a lifting wheel mounted on said support member adapted for pivotal movement therewith to lift the rear end of said elevating platform, an actuating rod extending from said support member under the elevating platform to the front end thereof, a lifting lever pivoted on the forward standard of said elevating platform, a portion of the lever extending downwardly from said pivot, means pivoting said downwardly extending portion to the forward end of said rod in substantially vertical alignment with said pivot, a portion of said lifting lever extending upwardly from said pivot, a cam surface fixed on said lifting head standard, and the upwardly extending portion of said lever bearing against said cam surface for movement thereby as said elevating platform moves upwardly relatively to said lifting head whereby to impart lifting movement to said lifting wheel support member and the lifting wheel mounted thereon.

3. In a truck of the class described, a lifting head having a vertical standard, an elevating platform having a vertical standard at the front end thereof, links pivotally mounting the forward vertical standard of said elevating platform for upward and forward lifting movement relatively to the standard of said lifting head, means for imparting upward movement to the forward end of said elevating platform relatively to said lifting head, a lifting wheel support member pivoted to the rear end of said elevating platform, a lifting wheel mounted on said support member adapted for pivotal movement therewith to lift the rear end of said elevating platform, an actuating rod extending from said support member under the elevating platform to the front end thereof, a lifting lever pivoted on the forward standard of said elevating platform, a portion of the lever extending downwardly from said pivot, means pivoting said downwardly extending portion to the forward end of said rod at a point so related to said pivot that said point will move substantially laterally and upwardly as said lever is rotated on its said pivot, a portion of said lifting lever extending upwardly from said pivot, a cam surface fixed on said lifting head standard, and the upwardly extending portion of said lever bearing against said cam surface for movement thereby as said elevating platform moves upwardly and forwardly relatively to said lifting head whereby to impart lifting movement to said lifting wheel support member and the lifting wheel mounted thereon.

4. In a truck of the class described, a lifting head, an elevating platform, upper and lower links pivoted between the forward end of said elevating platform and said lifting head whereby to mount said elevating platform for upward and forward movement relatively to said lifting head, means for imparting upward movement to the forward end of said elevating platform relatively to said lifting head, a lifting wheel support member pivoted to the rear end of said elevating platform, a lifting wheel mounted on said support member adapted for pivotal movement therewith to lift the rear end of said elevating platform, an actuating rod extending from said support member under the elevating platform to the front end thereof, a lifting lever pivoted on the forward end of said elevating platform, a portion of the lever extending vertically downwardly from said pivot, means pivoting said downwardly extending portion to the forward end of said rod at a point so related to said pivot that said point will move substantially laterally and upwardly as said lever is rotated on its said pivot, a portion of said lifting lever extending vertically upwardly from said pivot, a cam surface fixed on said lifting head, and the upwardly extending portion of said lever bearing against said cam surface for movement thereby as said elevating platform moves upwardly and forwardly relatively to said lifting head whereby to impart lifting movement to said lifting wheel support member and the lifting wheel mounted thereon.

5. In a truck of the class described, a lifting head, an elevating platform, means mounting the forward end of said elevating platform for upward movement relatively to said lifting head, means for imparting upward movement to the forward end of said elevating platform relatively to said lifting head, a lifting wheel support member pivoted to the rear end of said elevating platform, a lifting wheel mounted on said support member adapted for pivotal movement therewith to lift the rear end of said elevating platform, an actuating rod extending from said support member under the elevating platform to the front end thereof, a vertically aligned lifting lever pivoted on the forward end of said elevating platform between said elevating platform and said lifting head, a portion of the lever extending downwardly from said pivot, means pivoting said downwardly extending portion to the forward end of said rod at a point so related to said pivot that said point will move substantially laterally and upwardly as said lever is rotated on its said pivot, a portion of said lifting lever extending upwardly from said pivot, a cam surface fixed on said lifting head, and the upwardly extending portion of said lever bearing against said cam surface for movement thereby as said elevating platform moves upwardly relatively to said lifting head whereby to impart lifting movement to said lifting wheel support member and the lifting wheel mounted thereon.

6. In a truck of the class described, a lifting head having a vertical standard, an elevating platform having a vertical standard at the front end thereof, means mounting the forward vertical standard of said elevating platform for upward lifting movement relatively to the standard of said lifting head, means for imparting upward movement to the forward end of said elevating platform relatively to said lifting head, a lifting wheel support member pivoted to the rear end of said elevating platform, a lifting wheel mounted on said support member adapted for pivotal movement therewith to lift the rear end of said elevating platform, an actuating rod extending from said support member under the elevating platform to the front end thereof, a vertically aligned lifting lever pivoted on the forward standard of said elevating platform between said elevating platform and said lifting head, a portion of the lever extending downwardly from said pivot, means pivoting said downwardly extending portion to the forward end of said rod in substantially vertical alignment with said pivot, a portion of said lifting lever extending upwardly from said pivot, a cam surface fixed on said lifting head standard, and the upwardly extending portion of said lever bearing against said cam surface for movement thereby as said elevating platform moves upwardly relatively to said lifting head whereby to impart lifting movement to said lifting wheel support member and the lifting wheel mounted thereon.

7. In a truck of the class described, a lifting head, an elevating platform, means mounting the forward end of said elevating platform for upward movement relatively to said lifting head, means for imparting upward movement to the forward end of said elevating platform relatively to said lifting head, a lifting wheel support member pivoted to the rear end of said elevating platform, a lifting wheel mounted on said support member adapted for pivotal movement therewith to lift the rear end of said elevating platform, an actuating rod extending from said support member under the elevating platform to the front end thereof, a vertically aligned lifting lever pivoted on the forward end of said elevating platform between said elevating platform and said lifting head, a portion of the lever extending downwardly from said pivot, means pivoting said downwardly extending portion to the forward end of said rod at a point so related to said pivot that said point will move substantially laterally and upwardly as said lever is rotated on its said pivot, a portion of said lifting lever extending upwardly from said pivot, a cam surface fixed on said lifting head, and a roller mounted on the upwardly extending portion of said lever and bearing against said cam surface for movement thereby as said elevating platform moves upwardly relatively to said lifting head whereby to impart lifting movement to said lifting wheel support member and the lifting wheel mounted thereon.

8. In a truck of the class described, a lifting head, an elevating platform, means mounting the forward end of said elevating platform for upward movement relatively to said lifting head, means for imparting upward movement to the forward end of said elevating platform relatively to said lifting head, a lifting wheel support member pivoted to the rear end of said elevating platform, a lifting wheel mounted on said support member adapted for pivotal movement therewith to lift the rear end of said elevating platform, an actuating rod extending from said support member under the elevating platform to the front end thereof, a lifting lever pivoted on the forward end of said elevating platform, a portion of the lever extending downwardly from said pivot, means pivoting said downwardly extending portion to the forward end of said rod in substantially vertical alignment with said pivot, a portion of said lifting lever extending upwardly from said pivot, a cam surface fixed on said lifting head in a predetermined position, the upwardly extending portion of said lever bearing against said cam surface for movement thereby as said elevating platform moves upwardly relatively to said lifting head whereby to impart lifting movement to said lifting wheel support member and the lifting wheel mounted thereon, said predetermined position being selected in accordance with the lateral location of said elevating platform relatively to said lifting head.

9. In a truck of the class described, a lifting head having a vertical standard, an elevating platform having a vertical standard at the front end thereof, means mounting the forward vertical standard of said elevating platform for upward lifting movement relatively to the standard of said lifting head, means for imparting upward movement to the forward end of said elevating platform relatively to said lifting head, a lifting wheel support member pivoted to the rear end of said elevating platform, a lifting wheel mounted on said support member adapted for pivotal movement therewith to lift the rear end of said elevating platform, an actuating rod extending from said support member under the elevating platform to the front end thereof, a lifting lever pivoted on the forward standard of said elevating platform, a portion of the lever extending downwardly from said pivot, means pivoting said downwardly extending portion to the forward end of said rod at a point so related to said pivot that said point will move substantially laterally and upwardly as said lever is rotated on its said pivot, a portion of said lifting lever extending upwardly from said pivot, a cam surface fixed on said lifting head standard in a predetermined position, the upwardly extending portion of said lever bearing against said cam surface for movement thereby as said elevating platform moves upwardly relatively to said lifting head whereby to impart lifting movement to said lifting wheel support member and the lifting wheel mounted thereon, said predetermined position being selected in accordance with the lateral location of said elevating platform relatively to said lifting head.

10. In a truck of the class described, a lifting head, an elevating platform, means mounting the forward end of said elevating platform for upward movement relatively to said lifting head, means for imparting upward movement to the forward end of said elevating platform relatively to said lifting head, a lifting wheel support member pivoted to the rear end of said elevating platform, a lifting wheel mounted on said support member adapted for pivotal movement therewith to lift the rear end of said elevating platform, an actuating rod extending from said support member under the elevating platform to the front end thereof, a vertically aligned lifting lever pivoted on the forward end of said elevating platform between said elevating platform and said lifting head, a portion of the lever extending downwardly from said pivot, means pivoting said downwardly extending portion to the forward end of said rod at a point so related to said pivot that said point will move substantially laterally and upwardly as said lever is rotated on its said pivot, a portion of said lifting lever extending upwardly from said pivot, a cam surface fixed on said lifting head in a predetermined position, the upwardly extending portion of said lever bearing against said cam surface for movement thereby as said elevating platform moves upwardly relatively to said lifting head whereby to impart lifting movement to said lifting wheel support member and the lifting wheel mounted thereon, said predetermined position of said cam surface being selected in accordance with the lateral location of said elevating platform relatively to said lifting head.

11. In a truck of the class described, a lifting head, an elevating platform, means mounting the forward end of said elevating platform for upward movement relatively to said lifting head, means for imparting upward movement to the forward end of said elevating platform relatively to said lifting head, a lifting wheel support member pivoted to the rear end of said elevating platform, a lifting wheel mounted on said support member adapted for pivotal movement therewith to lift the rear end of said elevating platform, an actuating rod extending from said support member under the elevating platform to the front end thereof, a vertically aligned lifting lever pivoted on the forward end of said elevating platform between said elevating platform and said lifting head, a portion of the lever extending downwardly from said pivot, means pivoting said downwardly extending portion to the forward end of said rod at a point so related to said pivot that said point will move substantially laterally and upwardly as said lever is rotated on its said pivot, a portion of said lifting lever extending upwardly from said pivot, a cam surface fixed on said lifting head in a predetermined position, a roller mounted on the upwardly extending portion of said lever and bearing against said cam surface for movement thereby as said elevating platform moves upwardly relatively to said lifting head whereby to impart lifting movement to said lifting wheel support member and the lifting wheel mounted thereon, said predetermined position being selected in accordance with the lateral location of said elevating platform relatively to said lifting head.

12. In a truck of the class described, a lifting head having a vertical standard, an elevating platform having a vertical standard at the front end thereof, links pivotally mounting the forward vertical standard of said elevating platform for upward and forward lifting movement relatively to the standard of said lifting head, means for imparting upward movement to the forward end of said elevating platform relatively to said lifting head, a lifting wheel support member pivoted to the rear end of said elevating platform, a lifting wheel mounted on said support member adapted for pivotal movement therewith to lift the rear end of said elevating platform, an actuating rod extending from said support member directly under the elevating platform to the front end thereof, a vertically aligned lifting lever pivoted on the forward standard of said elevating platform between said elevating platform and said lifting head, a portion of the lever extending downwardly from said pivot, means pivoting said downwardly extending portion to the forward end of said rod at a point so related to said pivot that said point will move substantially laterally and upwardly as said lever is rotated on its said pivot, a portion of said lifting lever extending upwardly from said pivot, a cam surface fixed on said lifting head standard, and the upwardly extending portion of said lever bearing against said cam surface for movement thereby as said elevating platform moves upwardly and forwardly relatively to said lifting head whereby to impart lifting movement to said lifting wheel support member and the lifting wheel mounted thereon.

13. In a truck of the class described, a lifting head, an elevating platform having a forward substantially vertical standard and a rearwardly extending horizontal elevating platform, upper and lower parallel links mounting said elevating platform for pivotal lifting movement relatively to said lifting head, means for imparting lifting movement to the forward end of said elevating platform, a lifting wheel support member pivoted to the rear of said elevating platform, a lifting wheel mounted on said support member, a rod secured to said support member and extending under said horizontal elevating platform to the forward end thereof, a lifting lever, means pivotally mounting said lifting lever on the standard of said elevating platform with a part thereof extending downwardly from said pivotal mounting toward said rod and secured thereto, the point of securing being such that pivotal movement of said lever will substantially effect a lateral and upward movement of said point, a further portion of said lever extending vertically upwardly from said pivot, and a cam surface fixed to said lifting head and against which said further portion of said lever coacts to be moved pivotally as said standard swings upwardly on said parallel links relatively to said lifting head.

HERBERT J. FRAMHEIN.

REFERENCES CITED

The following references are of record in the file of this patent:

UNITED STATES PATENTS

| Number | Name | Date |
| --- | --- | --- |
| 2,358,957 | Barrett | Sept. 26, 1944 |
| 2,359,493 | Schreck | Oct. 3, 1944 |